Patented Mar. 1, 1949

2,463,456

UNITED STATES PATENT OFFICE 2,463,456

PRODUCTION OF NITRILES

William I. Denton, Woodbury, and Richard B. Bishop, Haddonfield, N. J., assignors to Socony-Vacuum Oil Company, Incorporated, a corporation of New York No Drawing. Application September 1, 1948, Serial No. 47,345

6 Claims. (Cl. 260—465)

This invention relates to a process for producing nitriles having at least two carbon atoms, and is more particularly concerned with a catalytic process for producing nitriles having at least two carbon atoms, from cycloolefinic hydrocarbons.

Nitriles are organic compounds containing combined nitrogen. Their formula may be represented thus: R—C≡N, in which R is an alkyl or an aryl group. These compounds are very useful since they can be converted readily to many valuable products such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aliphatic nitriles have been synthesized by oxidizing hydrocarbons to acids followed by reacting the acids thus obtained with ammonia in the presence of silica gel. Other methods involve reacting alkyl halides with alkali cyanides, reacting ketones with hydrogen cyanide in the presence of dehydration catalysts, etc. Aromatic nitriles have been synthesized by reacting alkali cyanides with aromatic sulfonates or with aromatic-substituted alkyl halides; by reacting more complex cyanides such as potassium cuprous cyanide, with diazonium halides; by reacting isothiocyanates with copper or with zinc dust; and by reacting aryl aldoximes with acyl halides.

We have now found a process for producing nitriles which is simple and inexpensive, and which employs non-toxic reactants.

We have discovered that nitriles containing at least two carbon atoms can be prepared by reacting cycloolefinic hydrocarbons with ammonia at elevated temperatures, in the presence of catalytic material containing a molybdenum oxide or a tungsten oxide.

Our invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Accordingly, it is an object of the present invention to provide a process for the production of nitriles containing at least two carbon atoms. Another object is to afford a catalytic process for the production of nitriles containing at least two carbon atoms. An important object is to provide a process for producing nitriles containing at least two carbon atoms which is inexpensive and commercially feasible. A specific object is to provide a process for producing nitriles containing at least two carbon atoms from cycloolefinic hydrocarbons. Other objects and advantages of the present invention will become apparent to those skilled in the art from the following description.

Broadly stated, our invention provides an inexpensive and commercially feasible process for the production of nitriles containing at least two carbon atoms, which comprises reacting a cycloolefinic hydrocarbon with ammonia, in the gaseous phase and at elevated temperatures, in the presence of catalytic material containing a metal oxide selected from the group consisting of molybdenum oxides and tungsten oxides.

Generally speaking, any cycloolefinic hydrocarbon is suitable as the hydrocarbon reactant in the process of our invention. 1-methyl cyclohexene-2, 1,3-dimethyl cyclohexene-2, 1,1,3-trimethyl cyclohexene-2, and methyl tetralin may be mentioned by way of non-limiting examples. It will be clear from the discussion of reaction temperatures set forth hereinafter, that many cycloolefinic hydrocarbons are not present per se when in contact with ammonia and a catalyst of the type used herein, for many of them are cracked to related hydrocarbons under such conditions. Nevertheless, all cycloolefinic hydrocarbons and their hydrocarbon decomposition products which are in the vapor phase under the herein-defined reaction conditions serve the purposes of the present invention. It is to be understood also, that hydrocarbon mixtures containing one or more cycloolefinic hydrocarbons may also be used herein, and that when such mixtures are used, the reaction conditions, such as contact time, will be slightly different in view of the dilution effect of the constituents present with the cycloolefinic hydrocarbon or hydrocarbons. Accordingly, cycloolefinic hydrocarbons, mixtures thereof and hydrocarbon mixtures containing one or more of such cycloolefinic hydrocarbons may be used.

The proportions of reactants, i. e., cycloolefinic hydrocarbon and ammonia, used in our process may be varied over a wide range with little effect on the conversion per pass and ultimate yield. In general, the charge of reactants may contain as little as 2 mol. per cent or as much as 98 mol. per cent of cycloolefinic hydrocarbons. In practice, however, we use charges containing between about 20 mol. per cent and about 90 mol. per cent of cycloolefinic hydrocarbon, and ordinarily, we prefer to use charges containing a molar excess of ammonia over the cycloolenic hydrocarbon reactant.

We have found that the catalysts to be used to produce nitriles containing at least two carbon atoms, by reacting cycloolefinic hydrocarbons with ammonia, are those containing a molybdenum oxide or a tungsten oxide, such as molybdenum sesquioxide ($Mo_2O_3$), molybdenum dioxide ($MoO_2$), molybdenum trioxide ($MoO_3$), molybdenum pentoxide ($Mo_2O_5$), tungsten dioxide ($WO_2$) and tungsten trioxide ($WO_3$). Therefore, and in the interest of brevity, it must be clearly understood that when we speak of molybdenum oxide or of tungsten oxide herein and in the claims, we have reference to the various oxides of molybdenum and tungsten. While all of these metal oxides are operative in the present process, they are not equivalent in their effectiveness from the standpoint of catalytic activity, tungsten dioxide ($WO_2$), for example, being far less effective than molybdenum trioxide ($MoO_3$), the latter being the preferred starting catalytic material.

While these metal oxides exhibit different degrees of effectiveness when used per se, they generally possess additional catalytic activity when used in conjunction with the well known catalyst supports, such as alumina, silica gel, Carborundum, pumice, clays, and the like. We especially prefer to use alumina ($Al_2O_3$) as a catalyst support, and we have found that a catalyst comprising a molybdenum trioxide supported on alumina is particularly useful for our purpose. Without any intent of limiting the scope of the present invention, it is suspected that the enhanced catalytic activity of the supported catalysts is attributable primarily to their relatively large surface area.

The concentration of catalytic metal oxide in the supported catalysts influences the conversion per pass. In general, the conversion per pass increases with increase in the concentration of metal oxide. For example, we have found that a catalyst comprising 20 parts by weight of molybdenum trioxide on 80 parts by weight of alumina is more effective than one comprising 10 parts by weight of molybdenum trioxide on 90 parts by weight of alumina. It is to be understood, however, that supported catalysts containing larger or smaller amounts of the catalytic metal oxides may be used in our process.

We have found also that in order to obtain initial maximum catalytic efficiency, particularly where the catalytic material comprises the higher catalytic metal oxides, that the catalysts should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of our process when the catalyst comes in contact with the ammonia reactant.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated, as is well known in the art, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and one minute, particularly, between 0.3 second and 30 seconds.

In general, the temperatures to be used in our process vary between about 850° F. and up to the decomposition temperature of ammonia (about 1250–1300° F.), and preferably, temperatures varying between about 925° F. and about 1075° F. The preferred temperature to be used in any particular operation will depend upon the nature of the cycloolefinic hydrocarbon reactant used and upon the type of catalyst employed. Generally speaking, the higher temperatures increase the conversion per pass but they also increase the decomposition of the reactants thereby decreasing the ultimate yields of nitriles. Accordingly, the criteria for determining the optimum temperature to be used in any particular operation will be based on the nature of the cycloolefinic hydrocarbon reactant, the type of catalyst, and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that the unreacted charge materials condense more readily. Subatmospheric pressures appear to favor the reactions involved since the reaction products have a larger volume than the reactants, and hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making nitriles is to introduce nitrogen directly into a hydrocarbon molecule, thereby avoiding intermediate steps with their accompanying increased cost. In our process, we have noted that considerable amounts of hydrogen are evolved, and that aliphatic nitriles as well as aromatic nitriles are obtained. Hence, it is postulated, without any intent of limiting the scope of the present invention, that in our process, the aliphatic nitriles are formed by an initial ring opening followed by replacement of hydrogen with nitrogen, while the aromatic nitriles are formed by the dehydrogenation of the cycloolefinic hydrocarbon reactants, followed by introduction of nitrogen therein.

The present process may be carried out by making use of any of the well-known techniques for operating catalytic reactions in the vapor phase effectively. By way of illustration, methyl cyclohexene and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration, etc. The reaction mixture will be predominantly a mixture of nitriles, hydrogen, toluene, unchanged methyl cyclohexene, and unchanged ammonia. The nitriles, the unchanged methyl cyclohexene and toluene will be condensed in passing through the condensing zone and will be retained in the receiving chamber. The nitriles can be separated from the unchanged methyl cyclohexene and toluene by any of the numerous and well known separation procedures, such as fractional distillation. Similarly, the uncondensed hydrogen and unchanged ammonia can be separated from each other. The unchanged methyl cyclohexene and ammonia, and toluene, if desired, can be recycled, with or without fresh methyl cyclohexene and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed examples are for the purpose of illustrating modes of preparing nitriles in accordance with the process of our invention, it being clearly understood that the invention is not to be considered as limited to the specific cycloolefinic hydrocarbon reactants or to the specific catalyst disclosed therein or to the manipulations and conditions set forth in the examples. As it will be apparent to those skilled in the art, a wide variety of other cycloolefinic hydrocarbons may be used.

*Example 1*

A reactor consisting of a shell containing a catalyst chamber heated by circulating a heat-transfer medium thereover, and containing 100 parts by weight of catalyst comprising 10 parts by weight of molybdenum trioxide supported on 90 parts by weight of activated alumina was used. The catalyst was conditioned by passing a stream of ammonia thereover for 45 minutes at 900° F. Ammonia and cyclohexene in a 2:1 molar ratio, were introduced in the vapor phase at 980° F. into the reactor at a rate to ensure a contact time of 2.3 seconds. The reaction mixture was passed from the reactor, through a condenser, into a first receiving chamber. Hydrogen and unchanged ammonia were collected in a second receiving chamber and then separated from each other. The nitrile and the unchanged cyclohexene (some of the cyclohexene was converted into benzene) remained in the first receiving chamber and were subsequently separated by distillation. About 2.5% by weight of the cyclohexene charged was converted into acetonitrile.

*Example 2*

The run set forth in Example 1 was repeated with the exception that the charge to the reactor was ammonia and methyl cyclohexene in a 2:1 molar ratio. The temperature and the contact time of this run were 1000° F. and 2.5 seconds, respectively. 1.2% by weight of the methyl cyclohexene was converted into acetonitrile, while 1.0% by weight, of the methyl cyclohexene was converted into benzonitrile. Appreciable amounts of toluene were also formed.

It will be apparent that the present invention provides an efficient, inexpensive and safe process for obtaining nitriles. Our process is of considerable value in making available relatively inexpensive nitriles which are useful, for example, as intermediates in organic synthesis.

This application is a continuation-in-part of copending application Serial Number 644,657, filed January 31, 1946, now abandoned, which in turn is a continuation-in-part of application Serial Number 539,033, filed June 6, 1944, now abandoned.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. The process for manufacturing nitriles having at least two carbon atoms, which comprises reacting a cycloolefinic hydrocarbon selected from the group consisting of methyl cyclohexenes, dimethyl cyclohexenes, trimethyl cyclohexenes, and methyl tetralin, with ammonia, in the gaseous phase, at temperatures varying between about 925° F. and about 1075° F., in the presence of a catalyst containing a molybdenum oxide.

2. The process for manufacturing nitriles having at least two carbon atoms, which comprises reacting a cycloolefinic hydrocarbon selected from the group consisting of methyl cyclohexenes, dimethyl cyclohexenes, trimethyl cyclohexenes, and methyl tetralin, with ammonia, in the gaseous phase, at temperatures varying between about 925° F. and about 1075° F., in the presence of a molybdenum oxide supported on a catalyst support.

3. The process for manufacturing nitriles having at least two carbon atoms, which comprises reacting a cycloolefinic hydrocarbon selected from the group consisting of methyl cyclohexenes, dimethyl cyclohexenes, trimethyl cyclohexenes, and methyl tetralin, with ammonia, in the gaseous phase, at temperatures varying between about 925° F. and about 1075° F., in the presence of molybdenum trioxide supported on alumina.

4. The process for manufacturing nitriles having at least two carbon atoms, which comprises reacting methyl cyclohexene with ammonia, in the gaseous phase, at temperatures varying between about 925° F. and about 1075° F., in the presence of a catalyst containing a molybdenum oxide.

5. The process for manufacturing nitriles having at least two carbon atoms, which comprises reacting methyl cyclohexene with ammonia, in the gaseous phase, at temperatures varying between about 925° F. and about 1075° F., in the presence of a molybdenum oxide supported on a catalyst support.

6. The process for manufacturing nitriles having at least two carbon atoms, which comprises reacting methyl cyclohexene with ammonia, in the gaseous phase, at temperatures varying between about 925° F. and about 1075° F., in the presence of molybdenum trioxide supported on alumina.

WILLIAM I. DENTON.
RICHARD B. BISHOP.

No references cited.